US008260817B2

(12) United States Patent
Boschee et al.

(10) Patent No.: US 8,260,817 B2
(45) Date of Patent: *Sep. 4, 2012

(54) SEMANTIC MATCHING USING PREDICATE-ARGUMENT STRUCTURE

(75) Inventors: Elizabeth Megan Boschee, Watertown, MA (US); Michael Levit, Berkeley, CA (US); Marjorie Ruth Freedman, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,225

(22) Filed: Jan. 24, 2011

(65) Prior Publication Data
US 2011/0153673 A1 Jun. 23, 2011

Related U.S. Application Data

(63) Continuation of application No. 11/974,022, filed on Oct. 10, 2007, now Pat. No. 7,890,539.

(51) Int. Cl.
G06F 7/02 (2006.01)
G06F 17/30 (2006.01)
(52) U.S. Cl. .................. 707/794; 707/797; 707/805
(58) Field of Classification Search .................. 707/794
See application file for complete search history.

(56) References Cited

U.S. PATENT DOCUMENTS

| 4,599,691 A | 7/1986 | Sakaki |
| 4,754,326 A | 6/1988 | Kram et al. |
| 4,809,351 A | 2/1989 | Abramovitz et al. |
| 4,914,590 A | 4/1990 | Loatman et al. |
| 5,062,143 A | 10/1991 | Schmitt |
| 5,343,537 A | 8/1994 | Bellegarda et al. |
| 5,396,419 A | 3/1995 | Morimoto |
| 5,406,480 A | 4/1995 | Kanno et al. |
| 5,418,717 A | 5/1995 | Su et al. |
| 5,438,630 A | 8/1995 | Chen et al. |
| 5,492,473 A | 2/1996 | Shea |
| 5,544,257 A | 8/1996 | Bellegarda et al. |
| 5,694,559 A | 12/1997 | Hobson et al. |
| 5,745,113 A | 4/1998 | Jordan et al. |
| 5,752,052 A | 5/1998 | Richardson et al. |
| 5,757,960 A | 5/1998 | Murdock et al. |
| 5,787,198 A | 7/1998 | Agazzi et al. |
| 5,822,747 A | 10/1998 | Graefe |
| 5,839,106 A | 11/1998 | Bellegarda |
| 5,841,895 A | 11/1998 | Huffman |
| 5,862,259 A | 1/1999 | Bokser et al. |

(Continued)

OTHER PUBLICATIONS

Office Action issued in U.S. Appl. No. 11/974,022 on Nov. 24, 2009.

(Continued)

Primary Examiner — Binh V Ho
(74) Attorney, Agent, or Firm — Ropes & Gray LLP

(57) ABSTRACT

The invention relates to topic classification systems in which text intervals are represented as proposition trees. Free-text queries and candidate responses are transformed into proposition trees, and a particular candidate response can be matched to a free-text query by transforming the proposition trees of the free-text query into the proposition trees of the candidate responses. Because proposition trees are able to capture semantic information of text intervals, the topic classification system accounts for the relative importance of topic words, for paraphrases and re-wordings, and for omissions and additions. Redundancy of two text intervals can also be identified.

27 Claims, 10 Drawing Sheets

U.S. PATENT DOCUMENTS

| | | | | |
|---|---|---|---|---|
| 5,903,858 | A | 5/1999 | Saraki | |
| 5,926,180 | A | 7/1999 | Shimamura | |
| 5,926,784 | A | 7/1999 | Richardson et al. | |
| 5,933,525 | A | 8/1999 | Makhoul et al. | |
| 5,940,821 | A * | 8/1999 | Wical | 1/1 |
| 5,963,940 | A | 10/1999 | Liddy et al. | |
| 5,963,965 | A | 10/1999 | Vogel | |
| 6,006,221 | A | 12/1999 | Liddy et al. | |
| 6,021,403 | A | 2/2000 | Horvitz | |
| 6,026,388 | A * | 2/2000 | Liddy et al. | 1/1 |
| 6,029,195 | A | 2/2000 | Herz | |
| 6,105,022 | A | 8/2000 | Takahashi et al. | |
| 6,112,168 | A | 8/2000 | Corston et al. | |
| 6,167,369 | A | 12/2000 | Schultz | |
| 6,243,669 | B1 | 6/2001 | Horiguchi et al. | |
| 6,243,670 | B1 | 6/2001 | Bessho et al. | |
| 6,260,035 | B1 | 7/2001 | Horvitz et al. | |
| 6,278,967 | B1 | 8/2001 | Akers et al. | |
| 6,278,968 | B1 | 8/2001 | Franz et al. | |
| 6,304,870 | B1 | 10/2001 | Kushmerick et al. | |
| 6,430,552 | B1 | 8/2002 | Corston-Oliver | |
| 6,442,584 | B1 * | 8/2002 | Kolli et al. | 718/104 |
| 6,600,501 | B1 | 7/2003 | Israel et al. | |
| 6,601,026 | B2 | 7/2003 | Appelt et al. | |
| 6,606,625 | B1 | 8/2003 | Muslea et al. | |
| 6,609,087 | B1 | 8/2003 | Miller et al. | |
| 6,615,207 | B1 | 9/2003 | Lawrence | |
| 6,681,044 | B1 | 1/2004 | Ma et al. | |
| 6,691,279 | B2 | 2/2004 | Yoden et al. | |
| 6,785,673 | B1 * | 8/2004 | Fernandez et al. | 1/1 |
| 6,795,825 | B2 | 9/2004 | Rishe | |
| 6,839,714 | B2 * | 1/2005 | Wheeler et al. | 1/1 |
| 6,853,992 | B2 | 2/2005 | Igata | |
| 6,892,189 | B2 | 5/2005 | Quass et al. | |
| 6,950,753 | B1 | 9/2005 | Rzhetsky et al. | |
| 7,031,970 | B2 | 4/2006 | Blitzer | |
| 7,062,483 | B2 | 6/2006 | Ferrari | |
| 7,081,834 | B2 | 7/2006 | Rukangas et al. | |
| 7,110,939 | B2 | 9/2006 | Ozawa et al. | |
| 7,143,091 | B2 | 11/2006 | Charnock et al. | |
| 7,146,030 | B2 | 12/2006 | Vailaya et al. | |
| 7,146,349 | B2 | 12/2006 | Benitez-Jimenez et al. | |
| 7,149,687 | B1 | 12/2006 | Gorin et al. | |
| 7,191,119 | B2 | 3/2007 | Epstein et al. | |
| 7,249,013 | B2 | 7/2007 | Al-Onaizan et al. | |
| 7,287,026 | B2 | 10/2007 | Oommen | |
| 7,292,976 | B1 | 11/2007 | Hakkani-Tur et al. | |
| 7,328,209 | B2 | 2/2008 | Das et al. | |
| 7,337,106 | B2 | 2/2008 | Liu | |
| 7,346,490 | B2 | 3/2008 | Fass et al. | |
| 7,496,621 | B2 | 2/2009 | Pan et al. | |
| 7,530,020 | B2 | 5/2009 | Szabo | |
| 7,593,967 | B2 | 9/2009 | Harnsberger et al. | |
| 7,620,538 | B2 | 11/2009 | Marcu et al. | |
| 7,630,879 | B2 | 12/2009 | Liu | |
| 7,650,283 | B2 | 1/2010 | Mizutani et al. | |
| 7,805,302 | B2 | 9/2010 | Chelba et al. | |
| 7,809,548 | B2 | 10/2010 | Mihalcea et al. | |
| 7,853,444 | B2 | 12/2010 | Wang et al. | |
| 7,890,539 | B2 | 2/2011 | Boschee et al. | |
| 7,987,176 | B2 | 7/2011 | Latzina et al. | |
| 2001/0029455 | A1 | 10/2001 | Chin et al. | |
| 2002/0035466 | A1 | 3/2002 | Kodama | |
| 2002/0107827 | A1 * | 8/2002 | Benitez-Jimenez et al. | 706/59 |
| 2003/0093613 | A1 | 5/2003 | Sherman | |
| 2003/0120640 | A1 | 6/2003 | Ohta et al. | |
| 2003/0189933 | A1 | 10/2003 | Ozugur et al. | |
| 2003/0195890 | A1 * | 10/2003 | Oommen | 707/100 |
| 2003/0208499 | A1 | 11/2003 | Bigwood et al. | |
| 2004/0039734 | A1 | 2/2004 | Judd et al. | |
| 2004/0049495 | A1 | 3/2004 | Lee et al. | |
| 2004/0098670 | A1 | 5/2004 | Carroll | |
| 2004/0111253 | A1 | 6/2004 | Luo | |
| 2004/0243531 | A1 | 12/2004 | Dean | |
| 2005/0039123 | A1 | 2/2005 | Kuchinsky et al. | |
| 2005/0278325 | A1 * | 12/2005 | Mihalcea et al. | 707/6 |
| 2006/0015320 | A1 | 1/2006 | Och | |
| 2006/0015324 | A1 * | 1/2006 | Pan et al. | 704/9 |
| 2006/0116866 | A1 | 6/2006 | Suzuki et al. | |
| 2006/0242101 | A1 | 10/2006 | Akkiraju et al. | |
| 2006/0245641 | A1 | 11/2006 | Viola et al. | |
| 2006/0253274 | A1 | 11/2006 | Miller | |
| 2006/0253476 | A1 | 11/2006 | Roth et al. | |
| 2006/0288023 | A1 * | 12/2006 | Szabo | 707/100 |
| 2007/0011150 | A1 | 1/2007 | Frank | |
| 2007/0136246 | A1 * | 6/2007 | Stenchikova et al. | 707/3 |
| 2007/0233696 | A1 * | 10/2007 | Ishihara et al. | 707/10 |
| 2008/0040095 | A1 | 2/2008 | Sinha et al. | |
| 2008/0215309 | A1 | 9/2008 | Weischedel | |
| 2008/0319947 | A1 * | 12/2008 | Latzina et al. | 707/3 |
| 2009/0006447 | A1 * | 1/2009 | Balmin et al. | 707/102 |
| 2009/0024385 | A1 | 1/2009 | Hirsch | |
| 2009/0063473 | A1 * | 3/2009 | Van Den Berg et al. | 707/5 |

OTHER PUBLICATIONS

Office Action issued in U.S. Appl. No. 11/974,022 on Jun. 10, 2010.
Office Action issued in U.S. Appl. No. 11/998,663 on Sep. 12, 2011.
Office Action issued in U.S. Appl. No. 12/240,605 on May 25, 2011.
Office Action issued in U.S. Appl. No. 10/806,406 on Sep. 5, 2007.
Office Action issued in U.S. Appl. No. 10/806,406 on Jan. 19, 2007.
Office Action issued in U.S. Appl. No. 11/411,206 on Aug. 13, 2009.
Office Action issued in U.S. Appl. No. 11/411,206 on Dec. 19, 2008.
Office Action issued in U.S. Appl. No. 10/806,406 on Apr. 29, 2008.
ACE (Automatic Content Extraction) English Annotation Guidelines for Entities, Ver.5.6.1, Linguistic Data Consortium, 34 pages. May 2005. http://www.Idc.upenn.edu/Projects/ACE/.
Agazzi, O.E., et al., "Hidden Markov Model Based Optical Character Recognition in the Presence of Deterministic Transformations," Pattern Recognition, vol. 26, No. 12, pp. 1813-1826, Dec. 1993.
Al-Badr, B., et al., "Survey and bibliography of Arabic optical text recognition," Signal Processing, vol. 41, No. 1, pp. 49-77, Jan. 1995.
Anigbogu, J.C., et al., "Performance Evaluation of an HMM Based OCR System," Proceedings of the 11th International Conference on Pattern Recognition, The Hague, The Netherlands, pp. 565-568, Aug. 1992.
Andreevskaia, A., et al., "Can Shallow Predicate Argument Structures Determine Entailment?," Proceedings from the 1st PASCAL Recognising Textual Entailment Challenge (RTE I), 4 pages, Southampton, UK, Apr. 2005.
Aone, C., et al., "SRA: Description of the IE2 System Used for MUC-7," Proceedings of the 7th Message Understanding Conference (MUC-7), pp. 1-14, 1998. Available at: http://www.itl.nist.gov/iaui/894.02/related_projects/muc/proceedings/muc_7_proceedings/sra_muc7.pdf.
Barzilay, R., et al., "Sentence Fusion for Multidocument News Summarization," Association for Computational Linguistics, vol. 31, No. 3, pp. 297-327, Sep. 2005.
Bellegarda, J., et al., "Tied Mixture Continuous Parameter Models for Large Vocabulary Isolated Speech Recognition," IEEE International Conference on Acoustics, Speech, and Signal Processing, pp. 13-16, May 23-26, 1989.
Bennett, S.W., et al., "Learning to Tag Multilingual Texts Through Observation," Proceedings of the Second Conference on Empirical Methods in Natural Language Processing, Association for Computational Linguistics, pp. 109-116, 1997.
Bippus, et al., "Cursive Script Recognition Using Semi Continuous Hidden Markov Models in Combination with Simple Features," IEE European Workshop on Handwriting Analysis and Recognition, pp. 6/1-6, Brussels, Jul. 1994.
Bock, J., et al., "Conceptual accessibility and syntactic structure in sentence formulation," Cognition 21, pp. 47-67, 1985.
Bose, et al., "Connected and Degraded Text Recognition Using Hidden Markov Model," Proceedings of the 11th International Conference on Pattern Recognition, vol. II, pp. 116-119, Aug. 3-Sep. 2, 1992.
Brill, E., "Automatic Grammar Induction and Parsing Free Text: A Transformation-Based Approach," Proceedings of the 31st Annual Meeting of the Association for Computational Linguistics, pp. 259-265, 1993.

Cardie, C., "Empirical Methods in Information Extraction," American Association of Artificial Intelligence (AAAI), vol. 18, No. 4, pp. 65-80, 1997.

Collins, M., "Three Generative, Lexicalised Models for Statistical Parsing," Proceedings of the 35th Annual Meeting of the Association for Computational Linguistics and 8th Conference of the European Chapter of the Association for Computational Linguistics, pp. 16-23, 1997.

Conrad, J.G., "A system for Discovering Relationships by Feature Extraction from Text Databases," Proceedings of the 17th Annual International ACM SIGIR Conference on Research and Development in Information Retrieval (SIGIR-94), pp. 260-270, 1994.

Cowie, J., "Information Extraction," Communications of the ACM, vol. 39, Issue 1, pp. 80-91, Jan. 1996.

De Marneffe, M.-C., et al., "Generating Typed Dependency Parses from Phrase Structure Parses"; Proceedings of 5th International Conference on Language Resources and Evaluation, pp. 1-6, Genoa, Italy, 2006.

De Salvo Braz, R., et al., "Knowledge Representation for Semantic Entailment and Question-Answering," Department of Computer Science, University of Illinois, pp. 110, 2005.

Dowding, J., et al., "Gemini: A Natural Language System for Spoken-Language Understanding," Annual Meeting of the Association for Computational Linguistics, pp. 54-61, Columbus, OH, 1993.

Fellbaum, C., "WordNet, an Electronic Lexical Database," MIT Press, 422 pages, Cambridge, MA, 1998.

Finn, A., et al., "Active Learning Selection Strategies for Information Extraction," Proceedings of the International Workshop on Adaptive Text Extraction and Mining, pp. 1-8, 2003.

Florian, R., et al., "A Statistical Model for Multilingual Entity Detection and Tracking," Proceedings of Human Language Technology Conference North American Association for Computational Linguistics, pp. 1-8, Boston, MA, 2004.

Forney, G.D., et al., "The Viterbi Algorithm," Proceedings of the IEEE, vol. 61, No. 3, pp. 268-278, 1973.

Gildea, D., "Loosely Tree-Based Alignment for Machine Translation," Proceedings of the 41st Annual Meeting of the Association for Computational Linguistics, pp. 80-87, Supporo, Japan, 2003.

Goldman, S., et al., "Enhancing Supervised Learning with Unlabeled Data," Proceedings of the 17th International Conference on Machine Learning (ICML-00), pp. 327-334, San Francisco, CA, 2000.

Gonzalez, et al., "Digital Image Processing," Addison-Wesley Pub. Co., pp. 416-418, 1992.

Grishman, R., "Information Extraction," Handbook of Computational Linguistics, pp. 1-11, 2003.

Grishman, R., "Adaptive Information Extraction and Sublanguage Analysis" Proceedings of the Workshop on Adaptive Text Extraction and Mining, 17th International Joint Conference on Artificial Intelligence (IJCAI-2001), pp. 1-4, Seattle, Washington, Aug. 2001.

Grishman, R., et al., "NYU's English ACE 2005 System Description," ACE 05 Evaluation Workshop, 2005. Online at http://nlp.cs.nyu.edu/publication.

Grisham, R., "Discovery Methods for Information Extraction," Proceedings of the ISCA & IEEE Workshop on Spontaneous Speech Processing and Recognition, Tokyo Institute of Technology, pp. 1-5, Tokyo, Japan, Apr. 2003.

Hasegawa, T., et al., "Discovering Relations among Named Entities from Large Corpora," Proceedings of the 42nd Annual Meeting of Association of Computational Linguistics (ACL-04), pp. 415-422, Barcelona, Spain, 2004.

Herrera, J., et al., "Textual Entailment Recognition Based on Dependency Analysis and WordNet," Proceedings of the 1st PASCAL Challenges Workshop on Recognising Textual Entailment, pp. 21-24, Southampton, UK, Apr. 2005.

Hoffmann C.M., et al., "Pattern Matching in Trees"; Journal of the Association for Computer Machinery, vol. 29, No. 1, pp. 68-95, Jan. 1982.

Humphreys, K., et al., "University of Sheffield: Description of the LaSIE-II System as Used for MUC-7," Proceedings of the 7th Message Understanding Conference (MUC-7), pp. 1-20, 1998. Available at: http://www.itl.nist.gov/iaui/894.02/related_projects/muc/proceedings/muc_7_proceedings/heffield_muc7.pdf.

Ji, H., et al., "Applying Coreference to Improve Name Recognition," Proceedings of the ACL 2004 Workshop on Reference Resolution and Its Applications, pp. 1-8, Barcelona, Spain, Jul. 2004.

Jones, R., et al., "Active Learning for Information Extraction with Multiple View Feature Sets," 20th International Workshop on Adaptive Text Extraction and Mining, pp. 1-8, Washington, DC, Aug. 21-24, 2003.

Kaltenmeier, et al., "Sophisticated Topology of Hidden Markov Models for Cursive Script Recognition," Proceedings of the Second International Conference on Document Analysis and Recognition, pp. 139-142, Tsukuba, Japan, Oct. 1993.

Kambhatla, N., "Combining Lexical, Syntactic, and Semantic Features with Maximum Entropy Models for Extracting Relations," Proceedings of the 42nd Anniversary Meeting of the Association for Computational Linguistics, pp. 1-4, 2004.

Karov, Y., et al., "Similarity-based Word Sense Disambiguation," Association for Computational Linguistics, vol. 24, Issue 1, pp. 1-26, Mar. 1998.

Kehler, A., et al., "The (Non) Utility of Predicate-Argument Frequencies for Pronoun Interpretation" Proceedings of Human Language Technology Conference, pp. 289-296, 2004.

Kehler, A. "Probabilistic Coreference in Information Extraction," Proceeding of the 2nd Conference on Empirical Methods in Natural Language Processing (EMNLP-2), pp. 163-173, Providence, RI, Aug. 1-2, 1997.

Kehler, A., et al., "Competitive Self-Trained Pronoun Interpretation," Proceedings of the Human Language Technology Conference, North American Chapter of the Association for Computational Linguistics, pp. 33-36, May 2004.

Kehler, A., "Current Theories of Centering for Pronoun Interpretation: A Critical Evaluation," Computational Linguistics, vol. 23, No. 3, pp. 467-475, 1997.

Kopec, G., et al., "Document Image Decoding Using Markov Source Models," IEEE.

Kilpeläinen, P., "Tree Matching Problems with Applications to Structure Text Databases," PhD thesis, Department of Computer Science, University of Helsinki, 113 pages, Finland, Nov. 1992.

Kingsbury, P., et al., "Adding Semantic Annotation to the Penn TreeBank"; Proceedings of the Human Language Technology Conference, pp. 1-5, San Diego, CA, 2002.

Kouylekov, M., et al., "Recognizing Textual Entailment with Tree Edit Distance Algorithms," Proceedings of PASCAL Challenges Workshop on Recognizing Textual Entailment, pp. 17-20, Southampton, UK, Apr. 2005.

Kundu, A., et al., "Recognition of Handwritten Script: a Hidden Markov Model Based Approach," Journal of the Pattern Recognition Society, Pergamon Press, vol. 22, No. 3, 283-297, 1989.

Lapata, M., "Probabilistic Text Structuring: Experiments with Sentence Ordering," Proceedings of the 41st Annual Meeting of the Association for Computational Linguistics, pp. 545-552, Jul. 2003.

Lehnert, W., et al., "Umass/Hughes: Description of the Circus System Used for MUC-5," Proceedings of the Fifth Message Understanding Conference (MUC-5), pp. 1-16, 1993.

Levin, E., et al., "Dynamic Planar Warping for Optical Character Recognition," Proceedings of the International Conference on Acoustics, Speech, and Signal Processing, vol. III, pp. 149-152, Mar. 1992.

Levit, M., "Spoken Language Understanding without Transcriptions in a Call Canter Scenario," PhD thesis, 249 pages, Logos Verlag, Berlin, Germany, 2005.

Makhoul, J., et al., "Vector Quantization in Speech Coding," Proceedings of IEEE, vol. 73, No. 11, pp. 1551-1588, Nov. 1985.

Marcus, M.P., et al., "Building a Large Annotated Corpus of English: The Penn Treebank," Computational Linguistics, vol. 19, No. 2, pp. 313-330, 1993.

Miller, S., et al., "Name Tagging with Word Clusters and Discriminative Training," Proceedings of the Human Language Technology Conference and Meeting of the North American Association for Computational Linguistics, pp. 337-342, 2004.

Moldovan, D., et al., "COGEX: A Logic Prover for Question Answering," Proceedings of the Human Language Technology and North American Chapter of the Association of Computational Linguistics Conference, vol. 1, pp. 87-93, Edmonton, Canada, 2003.

Narayanan S., et al., "Question Answering Based on Semantic Structures"; Proceedings of the 20th International Conference on Computational Linguistics (COLING-2004), Geneva, Switzerland, Aug. 2004.

Nguyen, L., et al., "The 1994 BBN/BYBLOS Speech Recognition System," Proceedings of the ARPA Spoken Language Systems Technology Workshop, Morgan Kaufmann Publishers, pp. 77-81, Jan. 1995.

Nigam, K., et al., "Text Classification from Labeled and Unlabeled Documents using EM, " Machine Learning, vol. 39, Issue 2-3, pp. 103-134, 2000.

Pang, B., et al., "Syntax-Based Alignment of Multiple Translations: Extracting Paraphrases and Generating New Sentences," Proceedings of the Human Language Technology and North American Chapter of the Association of Computational Linguistics Conference, pp. 102-109, Edmonton, Canada, 2003.

Park, H.-S., et al., "Off-line Recognition of Large-set Handwritten Characters with Multiple Hidden Markov Models," Pattern Recognition, vol. 29, No. 2, pp. 231-244, Elsevier Science Ltd, Great Britain, 1996.

Patten, T., et al., "Description of the TASC System Used for MUC-7," Proceedings of the 7th Message Understanding Conference (MUC-7), pp. 1-5, Fairfax, VA, 1998. Available at: http://www.itl.nist.gov/iaui/894.02/related_projects/muc/proceedings/muc_7_proceedings/tasc_muc7.pdf.

Pereira, F.C.N., et al., "Prolog and Natural-Language Analysis," Microtome Publishing, 204 pages, 2002.

Phillips, I.T., et al., "CD-ROM document database standard," Proceedings of the 2nd International Conference Document Analysis and Recognition, Tsukuba Science City, Japan, pp. 478-483, 1993.

Quirk, C., et al., "Dependency Treelet Translation: Syntactically Informed Phrasal Smt," Proceedings from the 43rd Annual Meeting of the Association for Computational Linguistics, pp. 271-279, Jun. 2005.

Rabiner, L., "A Tutorial on Hidden Markov Models and Selected Applications in Speech Recognition," Proceedings of the IEEE, vol. 77, No. 2, pp. 257-286, Feb. 1989.

Radev, D.R., et al., "Generating Natural Language Summaries from Multiple On-line Sources", Computational Linguistics, vol. 24, No. 3, pp. 469-500, 1998.

Ramshaw, L., et al., "Experiments in Multi-Modal Automatic Content Extraction," Proceedings of the 1st International Conference on Human Language Technology Research, pp. 1-4, San Diego, CA, 2001.

Riloff, E., "Automatically Generating Extraction Patterns from Untagged Text," Proceedings of the 13th National Conference on Artificial Intelligence (AAAI-96), pp. 1044-1049.

Sekine. S., "Named Entity: History and Future," Proteus Project Report, 2004.

Shwartz, R., "A Comparison of Several Approximate Algorithms for Finding Multiple (N-BEST) Sentence Hypotheses," Proceedings of the IEEE International Conference on Acoustics, Speech and Signal Processing (ICASSP), vol. 1, pp. 701-704, May 1993.

Schwartz, R.M., et al., "Improved Hidden Markov Modeling of Phonemes for Continuous Speech Recognition," Proceedings of the ICASSP, vol. 9, pp. 21-24, 1984.

Shinyama, Y., et al., "Named Entity Discovery Using Comparable News Articles," Proceedings of the International Conference on Computational Linguistics (COLING); pp. 848-853, 2004.

Sin, et al., "A Statistical Approach with HMMs for On-Line Cursive Hangul (Korean Script) Recognition," Proceedings of the Second International Conference on Document Analysis and Recognition, pp. 147-150, Oct. 1993.

Starner, T., et al., "On-Line Cursive Handwriting Recognition Using Speech Recognition Methods," IEEE International Conference on Acoustics, Speech, and Signal Processing, vol. 5, pp. V/125-V/128, Apr. 19-22, 1994.

Stone, M., et al., "Sentence Planning as Description Using Tree Adjoining Grammar," Proceedings of the 35th Annual Meeting of the Association for Computational Linguistics, pp. 198-205, Madrid, Spain, 1997.

Sudo, K., et al., "Cross-lingual Information Extraction System Evaluation," Proceedings from the International Conference on Computational Linguistics (COLING); pp. 882-888, 2004.

Sudo, K., et al., "An Improved Extraction Pattern Representation Model for Automatic IE Pattern Acquisition" Proceedings of the 41st Annual Meeting of the Association for Computational Linguistics, pp. 2224-231, Jul. 2003.

Thompson, et al., "Active learning for natural language parsing and information extraction", Proc. Of 6th International Machine Learning Conference, Jun. 1999.

Uchimoto, K., et al., "Word Translation by Combining an Example-Based Method and Machine Learning Models" J. Natural Language Processing, vol. 10, No. 3, pp. 87-114, 2003.

Vishwanathan, S.V.N., et al., "Fast Kernels for String and Tree Matching," Neural Information Processing Systems, 8 pages, MIT Press, 2004.

Vlontzos, J.A., et al., "Hidden Markov Models for Character Recognition," IEEE Transactions on Image Processing, vol. 1, Issue 4, pp. 539-543, Oct. 1992.

Wang, J.T.-L., et al., "A System for Approximate Tree Matching," IEEE Transactions on Knowledge and Data Engineering, vol. 6, No. 4, pp. 559-571, Aug. 1994.

Wu, D., "Stochastic Inversion Transduction Grammars and Bilingual Parsing of Parallel Corpora," Association for Computational Linguistics, vol. 23, No. 3, pp. 377403, Sep. 1997.

Yangarber, R., "Counter-Training in Discovery of Semantic Patterns," Proceedings of the 41st Annual Meeting for Computational Linguistics, pp. 343-350, Japan, 2003.

Yangarber, R., et al., "Unsupervised Learning of Generalized Names," Proceedings of the 19th International Conference on Computational Linguistics (COLING-02), pp. 1-7, 2002.

Yangarber, R., et al., "NYU: Description of the Proteus/PET System as Used for MUC-7 St," Proceedings of the 7th Message Understanding Conference (MUC-7), pp. 1-7, 1998. Available at: http://www.itl.nist.gov/iaui/894.02/related_projects/muc/proceedings/muc_7_proceedings/nyu_st_paper.pdf.

Younger, D.H., "Recognition and Parsing of Context-Free Languages in Time $n^3$ ," Information and Control, vol. 10, pp. 189-208, 1967.

Zelenko, D., et al., "Kernel Methods for Relation Extraction," Journal of Machine Learning Research, vol. 3, pp. 1083-1106, Mar. 2003.

Zhao, S., et al., "Extracting Relations with Integrated Information Using Kernel Methods," Proceedings of the 43rd Annual Meeting of ACL, pp. 419-426, Jun. 2005.

Zhao, S., et al., "Discriminative Slot Detection Using Kernel Methods," Proceedings of the 20th International Conference on Computational Linguistics (COLING-04), pp. 1-7, Geneva, Switzerland, 2004.

* cited by examiner

800
The shutdown of the Cernadova nuclear plant — 802
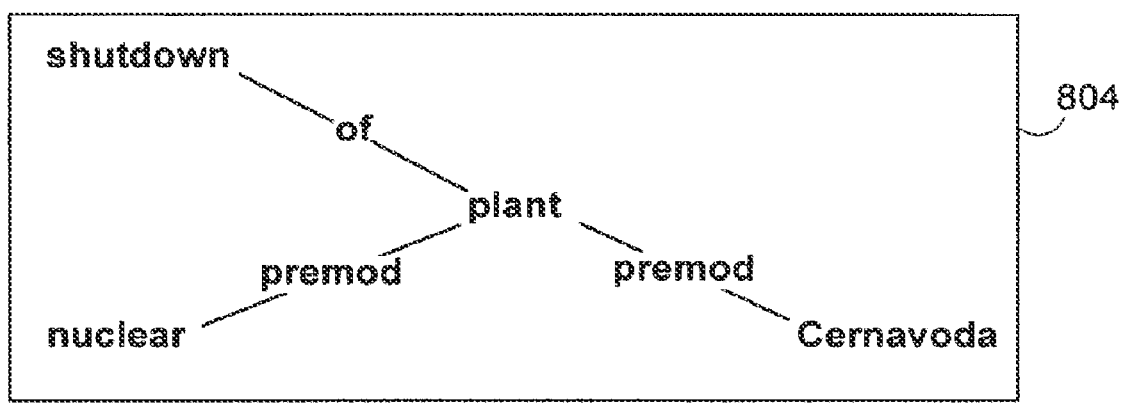
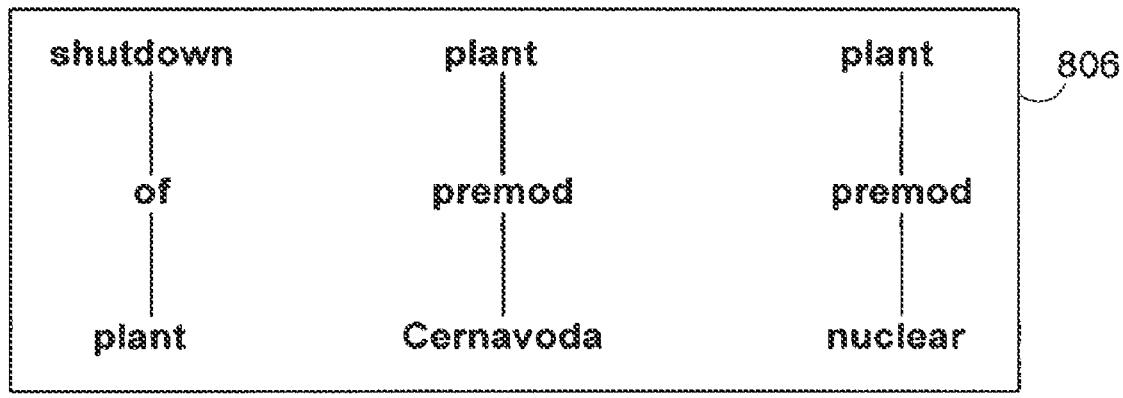
Figure 8

US 8,260,817 B2

SEMANTIC MATCHING USING PREDICATE-ARGUMENT STRUCTURE

CROSS REFERENCE TO RELATED APPLICATION

This application is a continuation of pending U.S. patent application Ser. No. 11/974,022, filed Oct. 10, 2007, which is hereby incorporated by reference herein in its entirety.

GOVERNMENT CONTRACT

The U.S. Government has a paid-up license in this invention and the right in limited circumstances to require the patent owner to license others on reasonable terms as provided for by the terms of Contract No. HR0011-06-C-0022 awarded by DARPA.

TECHNICAL FIELD

The invention relates in general to the field of topic classification, and more particularly to methods of processing free-text queries.

BACKGROUND

Topic classification systems are a class of machine learning tools designed to classify media based on information that has been extracted from the media. When topic classification systems are applied to the area of natural language processing, natural language inputs are classified and labeled based on the classes or topics that are found within the inputs. Typically, natural language inputs include text intervals. Text intervals are spans of text that need not be well-formed sentences and can come from a variety of sources, such as newspaper articles, books, e-mail, web articles, etc. For example, if the topic within a particular text interval is determined to be "the looting of Iraqi art galleries in 2003", a number of labels can be assigned, such as Iraqi art galleries, looting in Iraq in 2003, etc.

Although typical topic classification systems classify a large number of text intervals, the labels that are assigned to each text interval generally need to be defined in advance. For example, a database stores searchable text intervals, in which each text interval has been assigned pre-defined labels organized into a topic or keyword listing. When a user performs a database query using several keywords, the system produces a set of candidate text intervals that have labels containing one or more of those keywords.

However, in a situation where the system has no prior knowledge of the labels of the text intervals, the system needs to parse through a text interval to determine its labels. For example, if text intervals are provided at run-time via natural language or free-text formulations, the topic classification system can no longer rely on predefined labels to locate similar text intervals. An example of a free-text formulation of a query is "List facts about the widespread looting of Iraqi museums after the US invasion." Free-text queries differ from structured queries such as database queries where query terms need to be explicitly provided.

In order to respond to these free-text queries, the topic classification system needs to analyze various text intervals in a natural language document and determine whether the candidate responses are on-topic with the free-text queries. Although the topic classification system can match a free-text query to a candidate response if the query is simple and specific, but the system is limited with respect to matching a free-text query that contains a lengthy or complex description of some topic or event. In addition, human language makes it possible to convey on-topic information without using words that were used in the actual topic formulation. For example, given a free-text query of "List facts about the widespread looting of Iraqi museums after the US invasion," an on-topic response would be "Many works of art were stolen from Baghdad galleries in 2003." Furthermore, the presence of topic words in a sentence does not guarantee that the response will be relevant. For example, given the same query as before, an off-topic response would be "There were no known instances of looting of Iraqi museums before the U.S. invasion." In accordance with the present invention, a topic classification system that provides for matching complex free-text queries to candidate responses is provided.

SUMMARY

In one aspect the invention relates to a system that can process a text interval by extracting a proposition from a first text interval, and generating a proposition tree from the proposition, where each proposition tree includes a set of nodes and a set of edges. In one embodiment, in order to match a query to a response, the topic classification system can generate a first proposition tree for the query and a second proposition tree for the response. In order to determine the relevance of the response to the query, the system can calculate a first similarity value based on matching the first proposition tree to the second proposition tree. Finally, the system can select to output the response depending on whether the first similarity value exceeds a threshold.

In another embodiment, in order to determine the redundancy of two text intervals, the topic classification system can generate a first proposition tree for a first text interval and a second proposition tree for a second text interval. After generating proposition trees, the system can determine a second similarity value in addition to the first similarity value by a two-way comparison of the first proposition tree and the second proposition tree. Finally, the system can select not to output the second text interval based on whether the first and second similarity values exceed thresholds.

The matching process between the query and the response can be improved by augmenting the nodes of the first proposition tree to a first augmented proposition tree and augmenting the nodes of the second proposition tree to a second augmented proposition tree. One way to augment is by co-reference. Augmentation by co-reference includes identifying a real-world object, concept, or event in one or more nodes in the first proposition tree. Then the system can search the document that the query belongs to for alternative words that correspond to the same real-world object, concept, or event as the one or more nodes in the first proposition tree. Finally, nodes of the proposition tree can be augmented by the alternative words found using co-reference. Another way to augment nodes of the first proposition tree is by adding synonyms, hypernyms, hyponyms, substitutable labels, etc. to the nodes of the first proposition tree. The same approach can be used to augment the second proposition tree to create a second augmented proposition tree.

The similarity value used to determine the relevance of the response to the query can be calculated by performing a node-to-node match and an edge-to-edge match of the first proposition tree and the second proposition tree. One illustration of the similarity value is the transformation score that transforms the first proposition tree into the second proposition tree. In addition, a pair of nodes can match even if they are not initially identical. This type of matching can be accomplished by matching an augmented node of the first augmented proposition tree to an augmented node of the second augmented proposition tree. Furthermore, a pair of non-identical edges can match by allowing for the match of substitutable semantic relationships. Costs are associated with relaxing the matches of nodes and edges. In a situation where the query and the response generate a first and second set of proposition trees, a similarity value can calculated by aggregating the transformation scores across the two sets of augmented proposition trees, where each augmented proposition tree may be assigned a different weight.

A first set and second set of proposition subtrees can be generated from the first and second text intervals. A third similarity value can be generated by matching the first set of proposition subtrees to the second set of proposition subtrees. A first and second bag of nodes can be generated from the first and second text intervals. A fourth similarity value can be generated by matching the first bag of nodes to the second bag of nodes. The system can select to output the response based on whether the first, third or fourth similarity value exceeds its threshold.

According to another aspect, the invention provides a method of processing a text interval by extracting a proposition from the text interval, and generating a proposition tree from the proposition, where each proposition tree includes a set of nodes and a set of edges. In one embodiment, the method includes generating a first proposition tree for the query and a second proposition tree for the response in order to match a query to a response. The method also includes calculating a first similarity value based on matching the first proposition tree to the second proposition tree in order to determine the relevance of the response to the query. Finally, the method includes selecting to output or not output the response depending on whether the first similarity value exceeds a threshold.

BRIEF DESCRIPTION OF THE DRAWINGS

The foregoing and other objects and advantages of the invention will be appreciated more fully from the following further description thereof, with reference to the accompanying drawings. These depicted embodiments are to be understood as illustrative of the invention and not as limiting in any way:

FIG. 8 is an example of a comparison between a proposition tree and a proposition subtree, according to an illustrative embodiment of the invention;

DESCRIPTION OF AN ILLUSTRATIVE EMBODIMENT

To provide an overall understanding of the invention, certain illustrative embodiments will now be described, including a system and a method for processing free-text queries in a topic classification system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
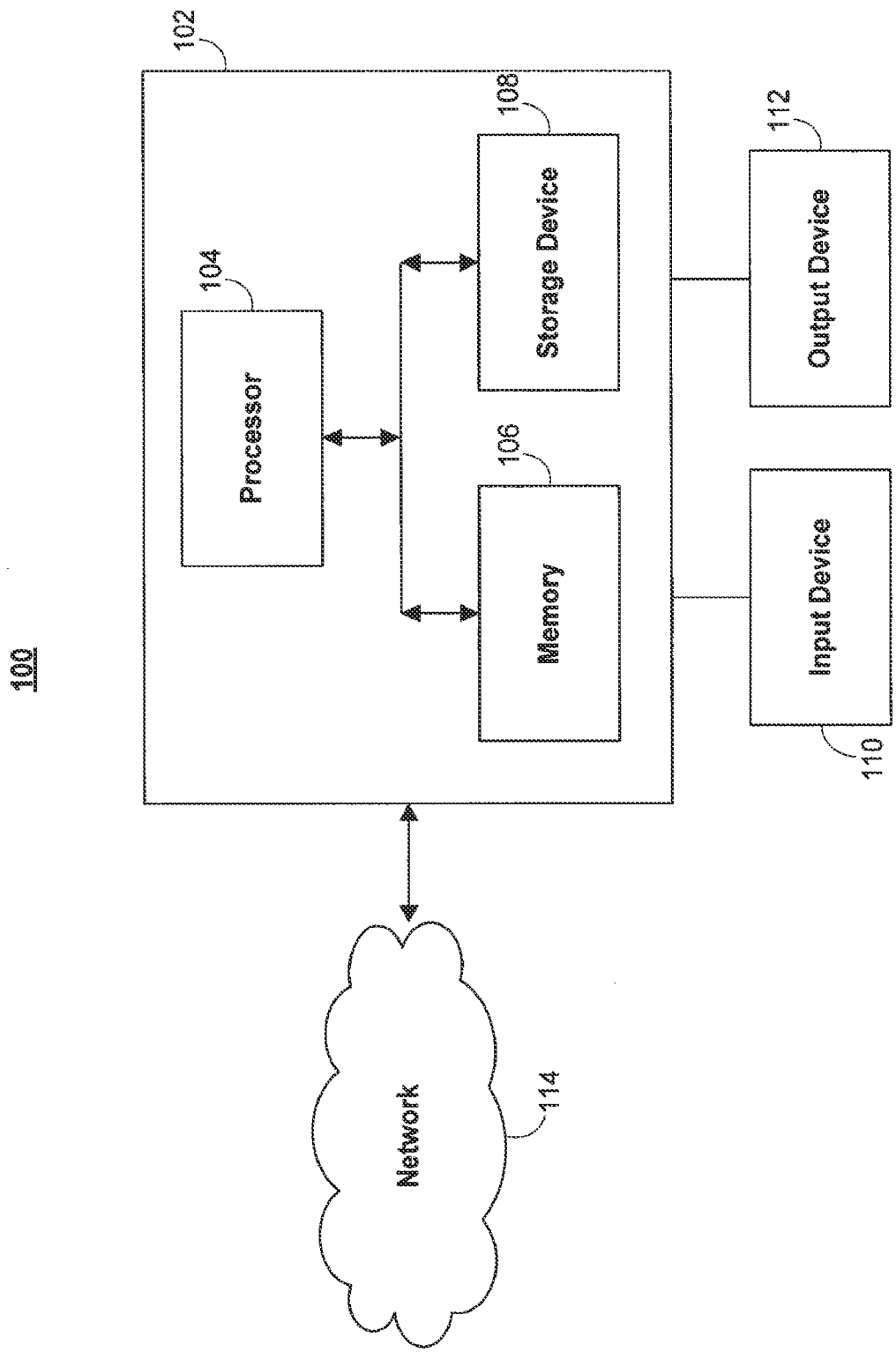
FIG. 1 shows a high level block diagram of a system in accordance with an illustrative embodiment of the invention.

FIG. 1 shows a high level block diagram of a system 100 in accordance with an illustrative embodiment of the invention. System 100 includes a computing device 102 that has processor 104, computer-readable medium 106, such as random access memory, and storage device 108. Computing device 102 also includes a number of additional external or internal devices. An external input device 110 and an external output device 112 are shown in FIG. 1. The input devices 110 include, without limitation, a mouse, a CD-ROM, or a keyboard. The output devices include, without limitation, a display or an audio output device, such as a speaker.

In general, computing device 102 may be any type of computing platform (e.g. one or more general or special purpose computers), and may be connected to network 114. Computing device 102 is exemplary only. Concepts consistent with the present invention can be implemented on any computing device, whether or not connected to a network.

Processor 104 executes program instructions stored in memory 106. Process 104 can be any of a number of well-known computer processors, such as processors from Intel Corporation, of Santa Clara, Calif. Processor 104 can be used to run operating system applications, topic classification applications, and/or any other application. Processor 104 can drive output device 112 and can receive user inputs from input device 110.

Memory 106 includes one or more different types of memory that may be used for performing system functions. For example, memory 106 includes cache, Flash, ROM, RAM, or one or more different types of memory used for temporarily storing data.

Storage device 108 can be, for example, one or more storage mediums. Storage device 108, may store, for example, application data (e.g., documents that can be used to generate candidate responses based on free-text queries).

Figure 2:
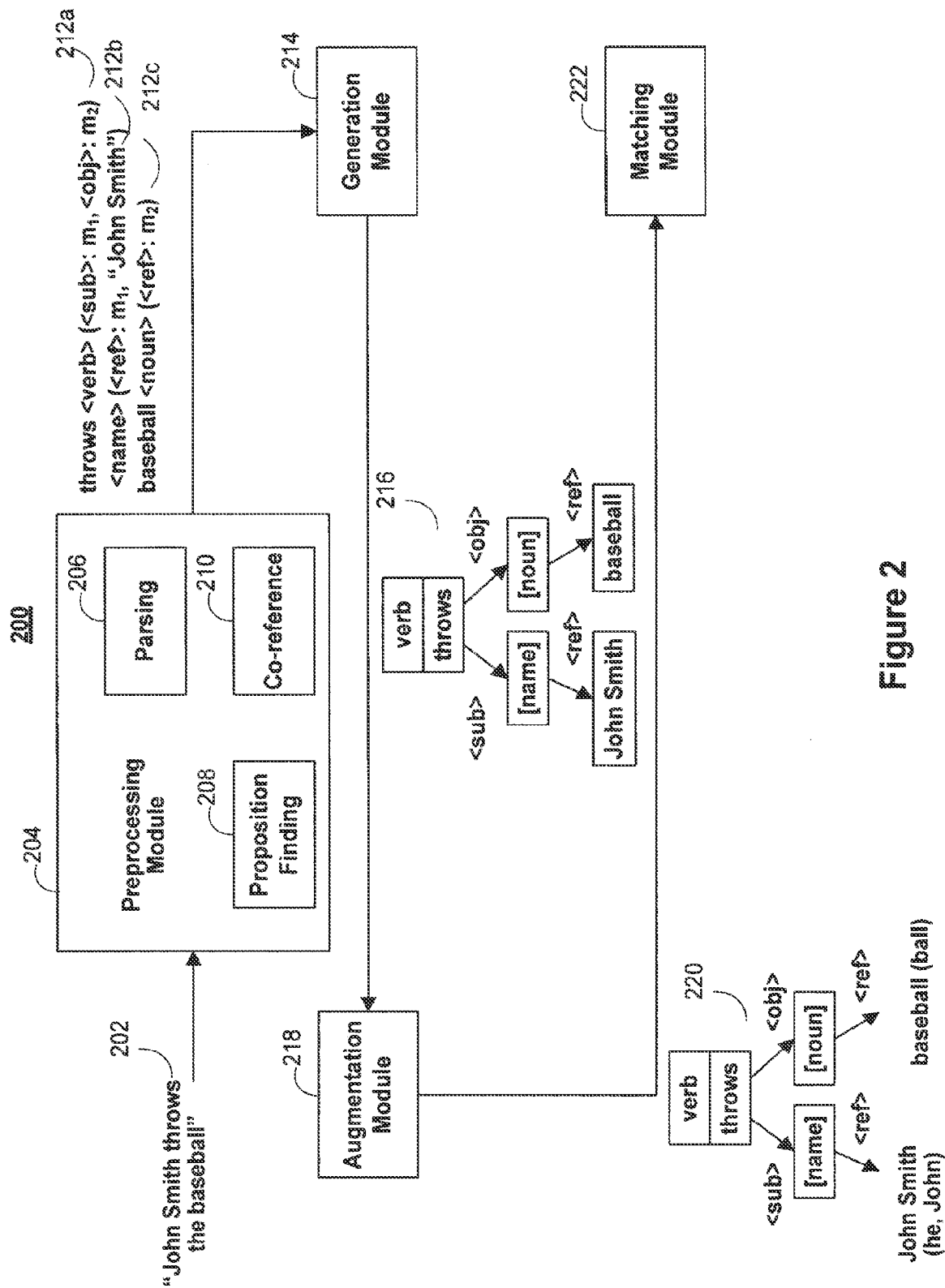
FIG. 2 is a block diagram of a topic classification system according to an illustrative embodiment of the invention.

FIG. 2 is a block diagram of a topic classification system 200, according to an illustrative embodiment of the invention. Topic classification system 200 includes preprocessing module 204, generation module 214, augmentation module 218, and matching module 222. While preprocessing module 204, generation module 214, augmentation module 218, and matching module 222 are described illustratively herein as software modules, in alternative implementations, modules may be implemented as hardware circuits comprising custom VLSI circuits or gate arrays, off-the-shelf semiconductors such as logic chips, transistors, or other discrete components.

A module may also be implemented in programmable hardware devices such as field programmable gate arrays, programmable array logic, programmable logic devices or the like.

In the illustrative embodiment, modules are implemented in software for execution by various types of processors, such as processor 104. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Topic classification system 200 is preferably implemented as computer readable instructions executable by processor 104 on computing device 102. The computer preferably includes storage device 108 for storing data collected and used by topic classification system 200. Topic classification system 200 derives text intervals from a natural language document. While topic classification system 200 is generally described with respect to text-based inputs, it should be understood that this system may also be used with non-text based inputs, such as verbal or audio inputs, etc.

Topic classification system 200 can take a free-text query and one or more candidate responses and determine the extent to which these candidate responses are relevant for the topic of the query. Topic classification system 200 is useful in application domains including dialog systems, story segmentation systems, and question answering systems, etc. Dialog systems are computer systems that are designed to converse with a human participant. An example of a dialog system is a system frequently employed by airlines that allows travelers to input a number of natural language queries in order to find flight information. Story segmentation systems include systems that segment a story based on various topics found within the story. Each segmentation is organized into sub-stories, where each sub-story has the same topic. Question answering systems include systems that are given a collection of documents and a query posed in a natural language or free-text format and retrieve answers based on the free-text query. In question answering systems, a topic classification system would be useful in situations where queries are focused entirely on a topic or event (e.g., "List facts about events described as follows: [EVENT]"), or the queries inquire about a particular aspect of a topic or the reaction an event solicited (e.g. "How did [COUNTRY] react to [EVENT]?").

Preprocessing module 204, extracts information from text intervals, such as sentences, phrases, free-text queries, candidate responses, etc., and converts the information into propositions, also called predicate-argument structures. A proposition describes how a particular predicate (e.g., a noun or verb) is related to arguments in a text interval (e.g., part of a text interval that surrounds the noun or verb). The proposition may capture more meaning from a text interval than, for instance, a keyword listing.

Propositions are classified as a particular type (e.g., VERB, NOUN, MODIFIER, SET, etc.) and include a predicate, and one or more arguments, where arguments may also be other propositions. Links define the semantic relationship between the predicate and its arguments. These links are labeled with roles (e.g., <object>, <subject>, <direct-object>, <premodifier>, any preposition, etc.). The standard notation for a proposition is: predicate<predicate-type>(role: argument, . . . , role: argument). For example, given a text interval such as text interval 202 "John throws the baseball," preprocessing module 204 produces outputs corresponding to propositions 106a-106c. Proposition 212a is of type VERB and has predicate "throws." Two arguments, m1 and m2, are linked to it. The first argument m1 is labeled as the subject of the predicate, and the second argument m2 is labeled as the object of the predicate. The subject and object labels define the roles of m1 and m2 with respect to the predicate "throws". Furthermore, two other propositions 212b (a NAME proposition) and 212c (a NOUN proposition) are created to represent m1 and m2. This proposition structure is merely illustrative. It should be understood that other suitable structures can be used.

Preprocessing module 204 includes a parsing module 206, a proposition finding module 208, and a co-reference module 210. Given a text interval, parsing module 206 identifies the parts of speech of words in the text interval and generates a syntactic parse tree of the text interval. The syntactic parse tree generally focuses on the grammatical structure of the text interval and captures the parts of speech for each word in a text interval.

Proposition finding module 208 normalizes the syntactic parse tree to find propositions. The normalization procedure includes: 1) finding the logical subject and object for predicates (e.g., verbs); 2) identifying noun modifications; and 3) identifying arguments of predicates (e.g., verbs) as mentions or propositions. Mentions are references to real-world objects, concepts, or events defined in a text interval. Objects, concepts, or events include any real-world entity, such as a person, place, organization, event, etc., or an abstract entity, such as an idea, number, etc. Mentions include names, nominal expressions, pronouns, etc. Each argument of a proposition has a role, where roles include a closed set of grammatical functions (e.g., subject, object, indirect object, etc.), as well as a set of preposition- and conjunction-based roles (e.g., to, of, that, etc.).

Co-reference module 210 can be used to process all text intervals in a natural language document. For each mention in the natural language document, co-reference module 210 automatically determines alternative words that refer to the same real-word object, concept, or event as the mention by searching through all text intervals in the document. Thus, co-reference module 210 finds other words that occur in the same role as the mention, but belong to other text intervals in the document.

One specific preprocessing module that can be used as preprocessing module 204 is the information extraction module, SERIF, available from BBN Technology Corp. of Cambridge, Mass. SERIF is described further in "Experiments in Multi-Modal Automatic Content Extraction" by L. Ramshaw, et al., published in *Proceedings of HLT*-01 in 2001, the entirety of which is incorporated herein by reference.

Generation module 214 assembles all of the propositions produced by preprocessing module 204 into proposition trees. For example, generation module 214 assembles the components of proposition 212a into proposition tree 216. In general, a proposition tree is a coherent tree structure representing a text interval's meaning (e.g. semantics), abstracted from the text interval's exact grammatical structure (e.g. syntax). The nodes of the proposition tree include either predicates or arguments (e.g., verbs, nouns, names, adjectives, etc.), and the edges of the proposition tree are labeled with roles that define the semantic relationship between the nodes. It is possible for a predicate nodes to represent a conjunction (e.g., "for," "and," "nor," "but," etc.) or a disjunction (e.g., "either," "or", etc.) of argument nodes.

Figure 3:
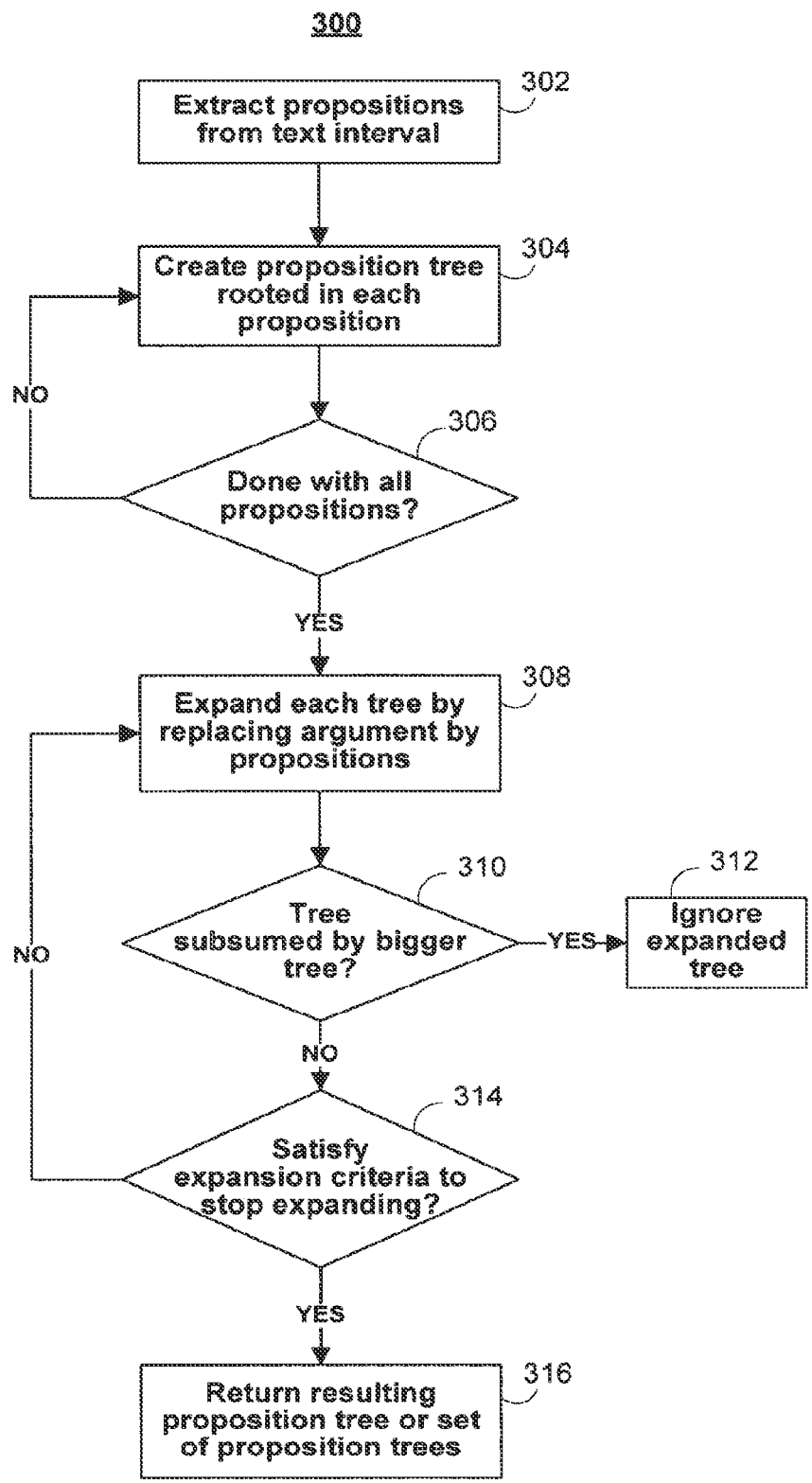
FIG. 3 is a flowchart of a method for generating proposition trees, according to an illustrative embodiment of the invention.
Figure 4:
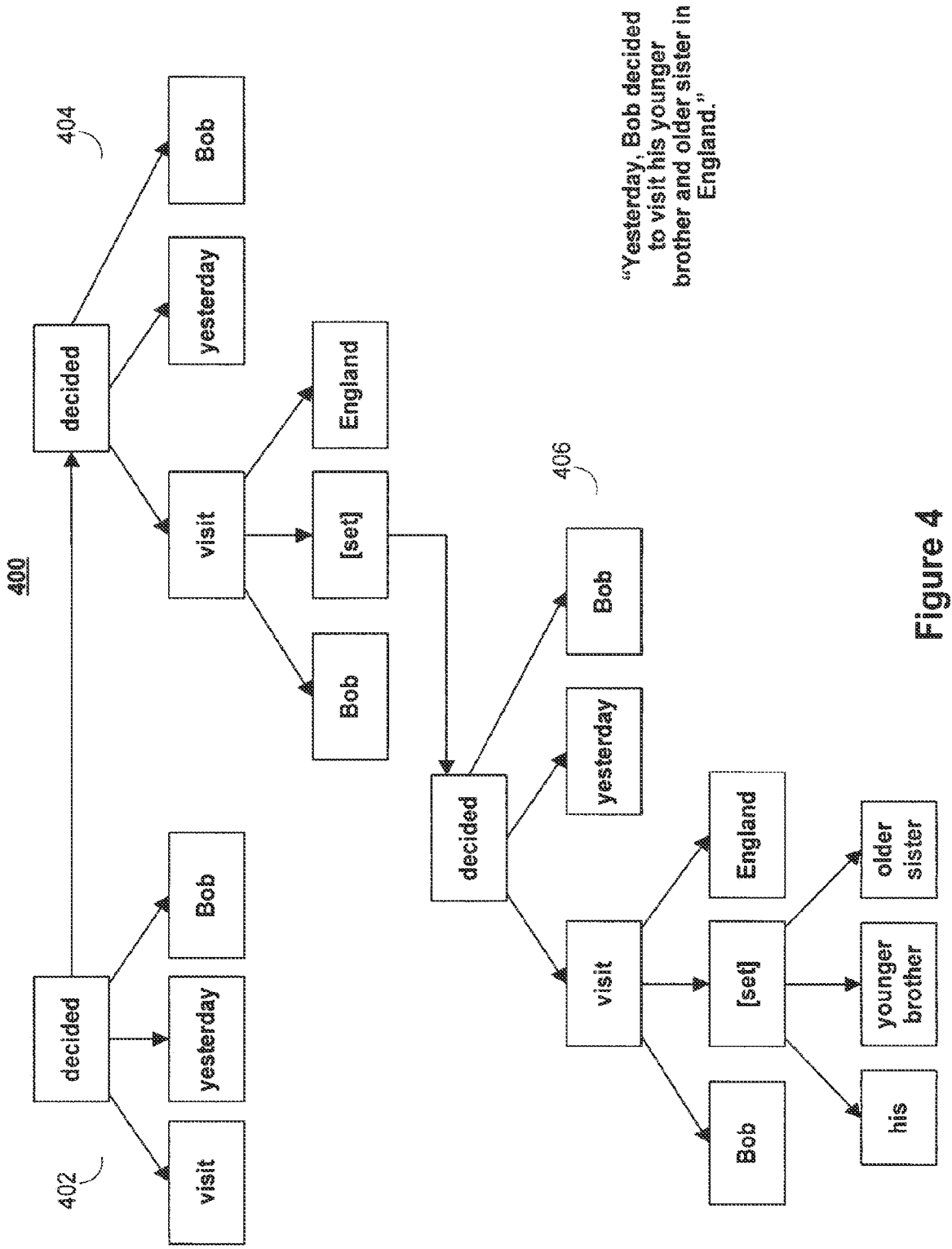
FIG. 4 is an example of applying a portion of the method illustrated in FIG. 3, according to an illustrative embodiment of the invention.

FIG. 3 is a flowchart 300 of a method for generating proposition trees, according to an illustrative embodiment of the invention. FIG. 4 is an example of applying a portion of the method 300 to a text interval, according to an illustrative embodiment of the invention. Referring first to FIG. 3, in step 302, preprocessing module 204 extracts propositions from a text interval. In step 304, for each extracted proposition, generation module 214 creates a proposition tree that is rooted in that proposition. The root node of a proposition tree is a predicate node that has one or more edges stemming from it. The edges are connected to argument nodes of the root node. FIG. 4 depicts an illustrative proposition tree 402. The proposition tree 402 that has a root node of "decided", and three edges that are connected to three argument nodes: "visit," "yesterday," and "Bob." Referring back to FIG. 3, in step 306, generation module 214 determines whether a proposition tree has been created for all propositions that have been extracted. After generation module 214 has determined that a proposition tree has been created for all extracted propositions, generation module 214 expands each tree in step 308 by replacing its argument nodes with appropriate propositions. Referring back to FIG. 4, after a first iteration, generation module 214 generates proposition tree 404. Argument node "visit" of proposition tree 402 has been expanded to connect to three more nodes: "Bob," a set-proposition node representing "and", and "England." Proposition trees 402 and 404 can also be referred to as proposition subtrees, which will be further discussed in FIG. 7. When generation module 214 has determined that a proposition tree has not been created for all extracted propositions, generation module 214 can go back to step 304 and continue to create proposition trees.

In step 310, generation module 214 determines whether the expanded proposition tree is already subsumed by another, bigger proposition tree. If it is determined by generation module 214 that the expanded proposition tree has been subsumed by another, bigger proposition tree, the module can ignore the expanded proposition tree. When generation module 214 has determined that the expanded proposition tree has not been subsumed by another, bigger proposition tree, the module determines in step 314 whether the expansion criteria have been satisfied. Expansion criteria are user specified metrics that indicates the desired level of proposition tree expansion. In general, smaller expansions create a greater number of smaller proposition trees, whereas larger expansions create a smaller number of bigger proposition trees. A fully expanded proposition tree is a tree in which all of the argument nodes have been expanded. For example, in FIG. 4, after two iterations, generation module 214 produces fully expanded proposition tree 406. The set-proposition node has been expanded to connect to three more nodes: "his," "younger brother," and "older sister."

When generation module 214 has determined that the expansion criteria has been satisfied, the module returns in step 316 the resulting proposition tree or set of proposition trees that represents the text interval. If it is determined in step 314 that the expansion criteria has not been satisfied, generation module 214 can go back to step 308 and continue to expand each tree by replacing its argument nodes by propositions.

Therefore, by analyzing all propositions contained within a text interval, a set of proposition trees is created to represent the text interval, where the root node of each proposition tree is a different proposition. In addition, since text intervals can be sentence fragments, method 300 may be used to process free-text queries, which often contains words that do not form a complete sentence.

Referring back to FIG. 2, augmentation module 218 augments a proposition tree associating one or more words with various nodes in the proposition tree. Augmentation module 218 can use various sources to locate substitutable words to augment a node. Substitutable words include synonyms, substitutable labels, co-references, etc. Co-references, generated from co-reference module 210, are a group of words that refer to the same real-word object, concept, or events. For example, consider the following example paragraph:

John Smith throws the baseball. He has a good arm and was able to throw the ball pretty far. John is one of the most popular players on the team.

Given a first text interval such as the first sentence in the paragraph above, co-reference module 210 can produce the following co-references by examining the rest of the paragraph: "he" and "John" refer to "John Smith," and "ball" refers to "baseball". As mentioned previously, co-reference module 210 can be provided by SERIF, an information extraction system, available from BBN Technology Corp. of Cambridge, Mass. Augmentation module 218 then uses these co-references to augment the nodes of proposition tree 216 to generate augmented proposition tree 220. By augmenting the nodes of proposition trees, two nodes can match even if they are not initially identical. Augmenting nodes in a proposition tree will be further discussed in relation to FIG. 4.

Matching module 222 is for matching two text intervals. Matching module 222 determines if a candidate response is on-topic with a free-text query. This module will be further discussed in FIG. 6.

Figure 5:
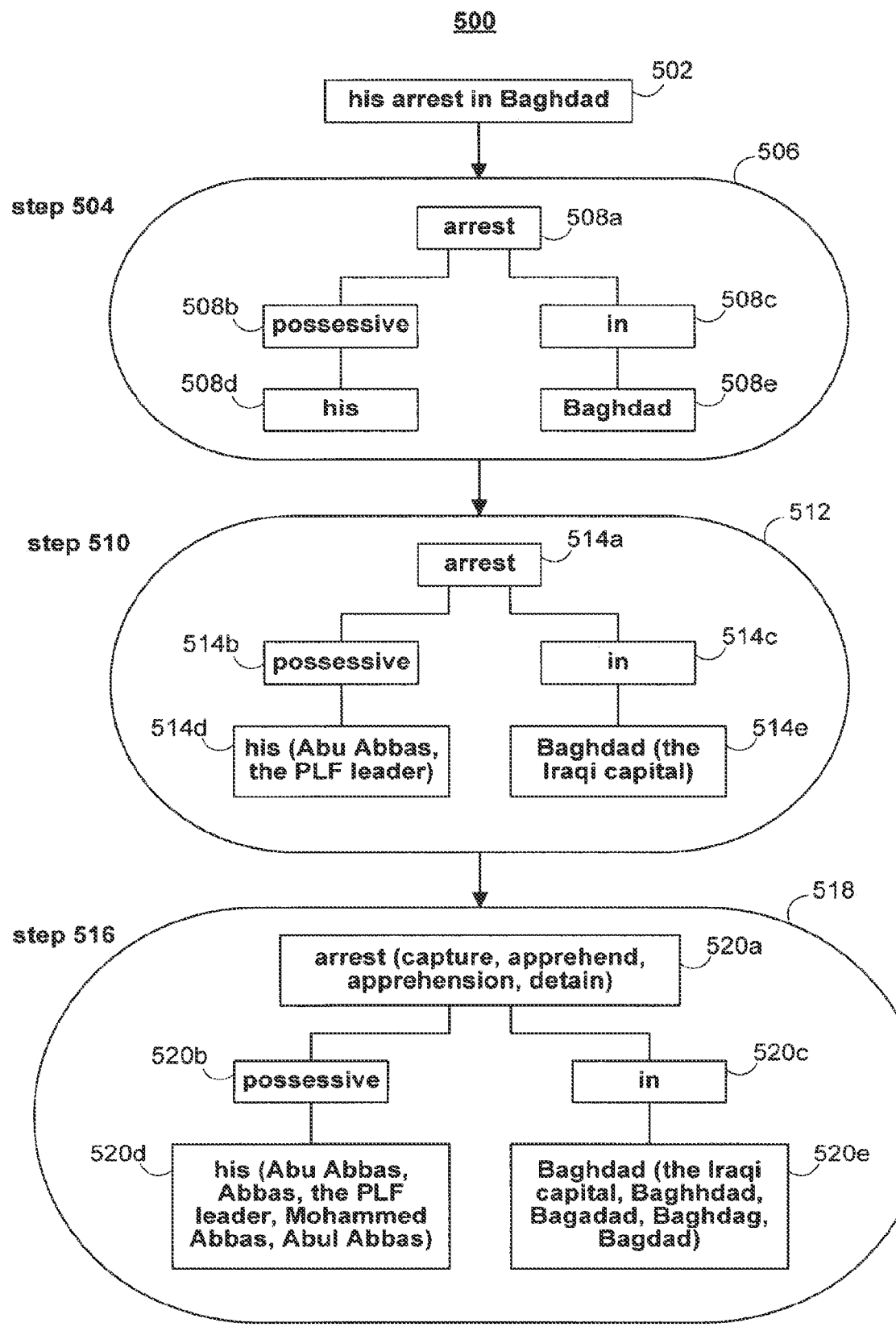
FIG. 5 is a flowchart of an example of augmenting nodes in a proposition tree, according to an illustrative embodiment of the invention.

FIG. 5 is an example 500 of augmenting nodes in a proposition tree, according to an illustrative embodiment of the invention. In example 500, a proposition tree corresponding to text interval 502 "his arrest in Baghdad" is augmented. In step 504, text interval 502 is transformed by generation module 214 into proposition tree 506 that includes nodes 508a-e. In step 510, co-reference module 210 expands proposition tree 506 to form augmented proposition tree 512 that includes nodes 514a-e. In particular, nodes 508d ("his") and 508e ("Baghdad") have been augmented in nodes 514d and 514e to also include "Abu Abbas, Abbas, the PLF leader" and "the Iraqi capital," respectively.

In step 516, external sources can be used to further augment augmented proposition tree 512 to form augmented proposition tree 518. Augmented proposition tree 518 includes nodes 520a-e. In particular, nodes 514a ("arrest"), 514d and 514e have been augmented to yield nodes 520a ("arrest, capture, apprehend, apprehension, detain"), 520d ("his, Abu Abbas, Abbas, the PLF leader, Mohammed Abbas, Abul Abbas"), and 520e ("Baghdad, the Iraqi capital, Baghdad, Bagadad, Baghdag, Bagdad"), respectively. External sources may include a nominalization table and/or external dictionaries, where synonyms, alternative spellings for names, nationalities, and capitals to country names, etc., can be identified to augment nodes in a proposition tree. Another external source which may be employed is WordNet, which is described in "WordNet, an Electronic Lexical Database" by C. Fellbaum, published in 1998, the entirety of which is incorporated herein by reference. By using WordNet, stemmed versions of a word, as well as the word's synonyms, directly connected hypernyms and hyponyms can be added to a proposition tree node.

Some augmentation sources and augmentation relationships may be more reliable than other sources for generating words to augment a node. As a result, in addition to storing the substitutable word used to augment a node, other information regarding the substitutable word may be stored as well. For example, the source of the substitutable word and the relationship between the substitutable word and the original word (e.g., synonym, hypernym, etc.) may also be stored.

Figure 6:
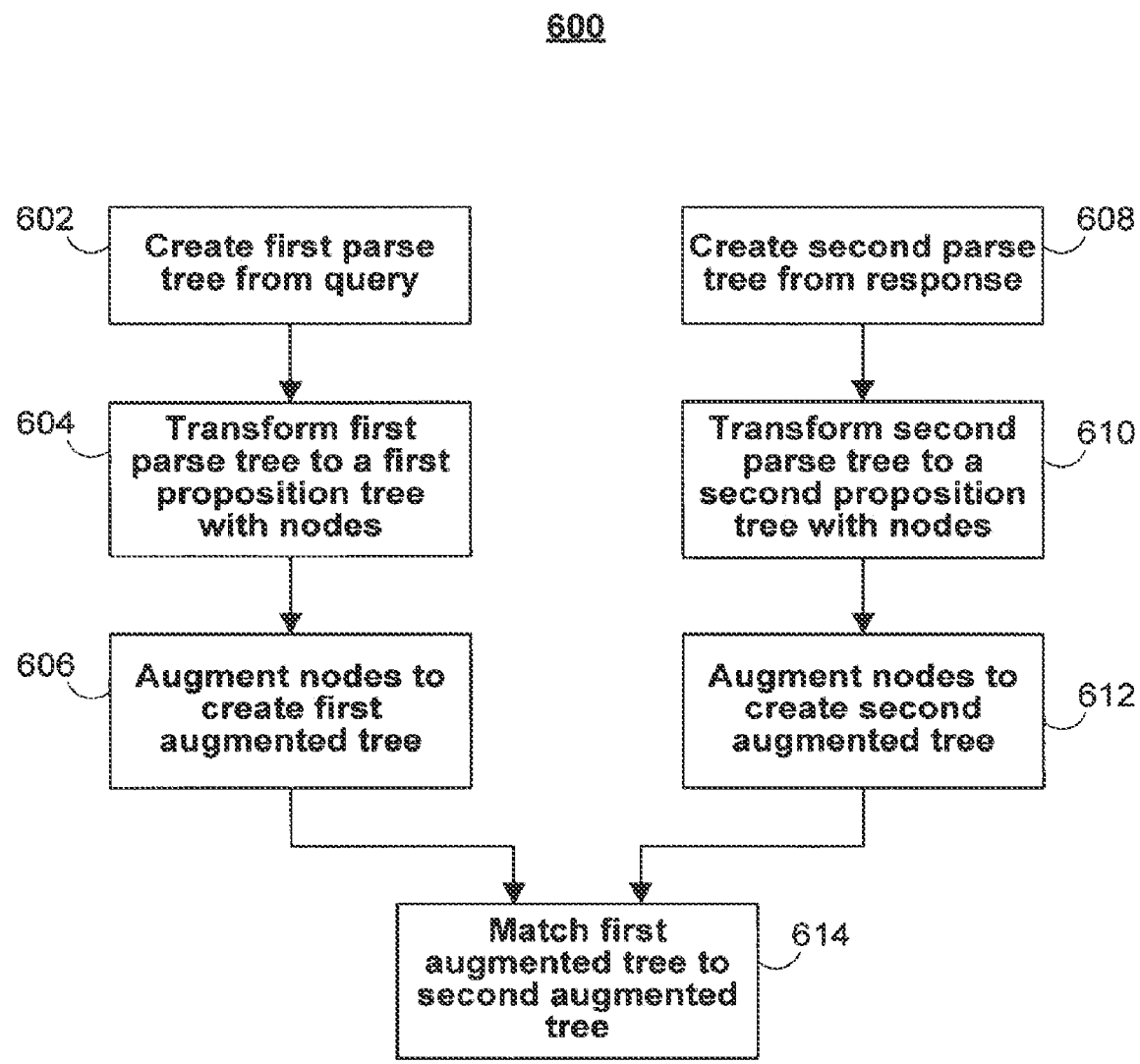
FIG. 6 is a flowchart of a method for matching a free-text query to a candidate response in a topic classification system, according to an illustrative embodiment of the invention.
Figure 7:
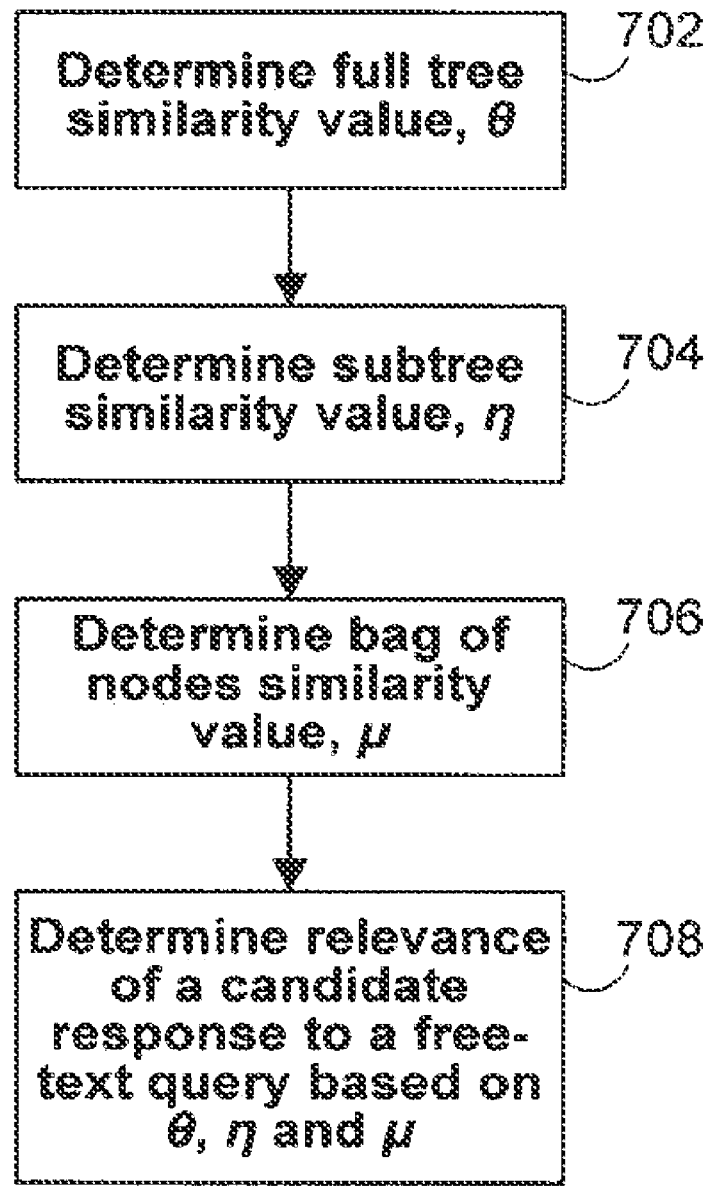
FIG. 7 is a flowchart of a method for determining the relevance of a candidate response to a free-text query by calculating similarity values, according to an illustrative embodiment of the invention.
Figure 10:
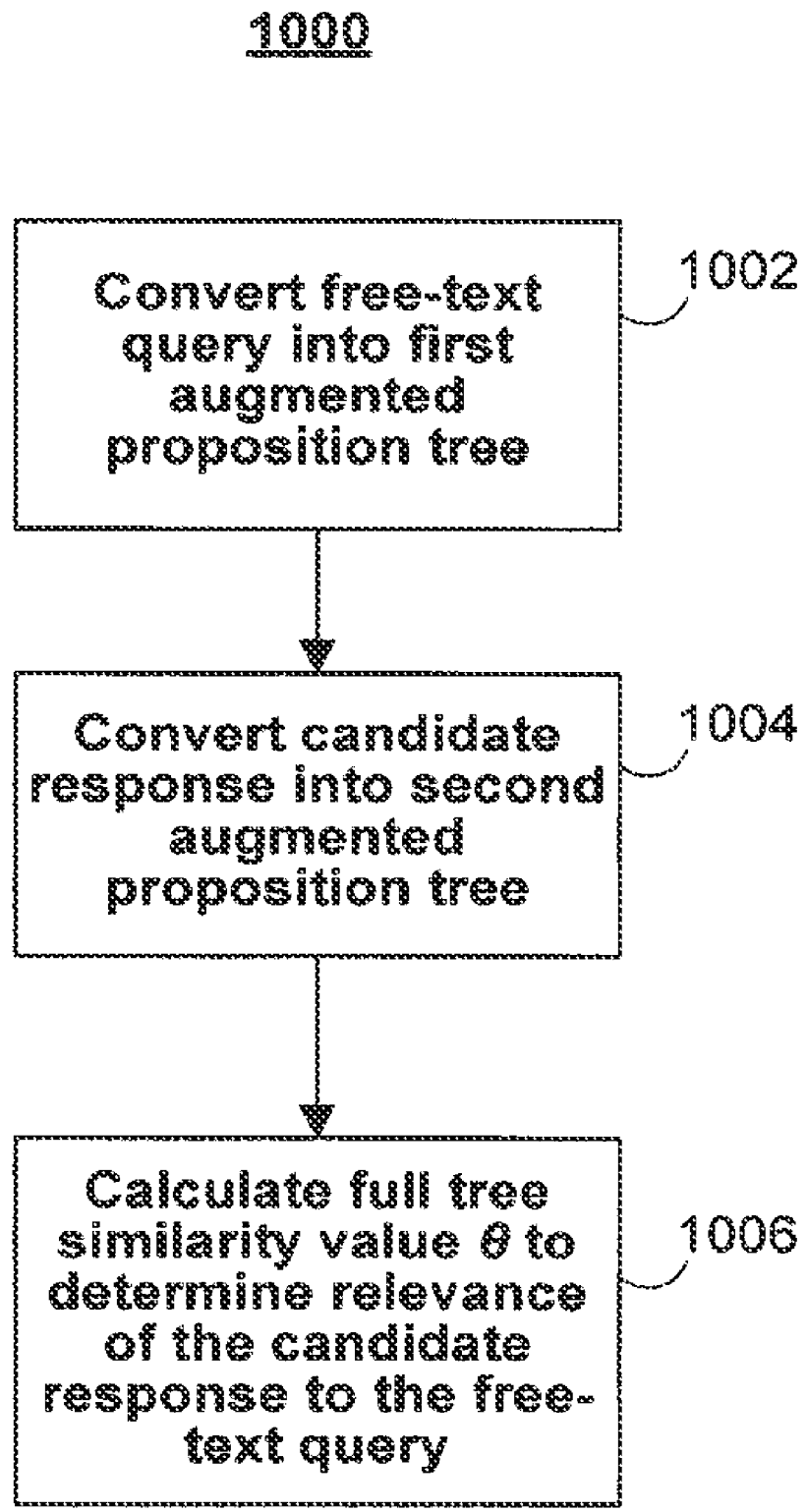
FIG. 10 is a flowchart of a method for calculating a full tree similarity value using augmented proposition trees, according to an illustrative embodiment of the invention.

FIG. 6 is a flowchart 600 of a method for matching a free-text query to a candidate response in a topic classification system, according to an illustrative embodiment of the invention. As discussed previously, a topic classification system can respond to free-text queries by analyzing various candidate responses in a natural language document and determining whether the candidate responses are on-topic with the free-text queries. For example, augmentation module 218 can generate an augmented proposition tree from a text interval. Matching module 222 can further compare the relevance of a candidate response text interval to the free-text query after an augmented proposition tree has been generated for one or both text intervals. The matching and scoring methodology described in relation to FIGS. 6, 7, and 10 are described in relation to comparing single proposition trees, where a first proposition tree has been generated for the free-text query, and a second proposition tree has been generated for the candidate response. However, in circumstances where the free-text query and the candidate response each yield sets of proposition trees, the matching and scoring methodology given can be aggregated across the sets of proposition trees. Proposition trees in each set may be weighted based on their sizes.

Flowchart 600 provides a method of comparing whether a candidate response is on-topic with a free-text query. In step 602, preprocessing module 204 creates a first parse tree from the free-text query. In step 604, generation module 214 transforms the first parse tree to a first proposition tree that includes a set of nodes. Next, in step 606, augmentation module 218 augments the first proposition tree to a first augmented proposition tree.

A similar process applies when a candidate response is presented to the topic classification system. In step 608, preprocessing module 204 creates a second parse tree from the candidate response. In step 610, generation module 214 transforms the second parse tree to a second proposition tree that includes a set of nodes. Next, in step 612, augmentation module 218 augments the second proposition tree to a second augmented proposition tree. In step 614, matching module 222 matches the first and second augmented proposition trees and calculates similarity values to determine the relevance of the candidate response to the free-text query. Similarity values indicate whether the candidate response is on-topic with the free-text query. The candidate response can then be outputted based on the similarity value.

FIG. 7 is a flowchart 700 of a method for determining the relevance of a candidate response to a free-text query by calculating similarity values, according to an illustrative embodiment of the invention. As presented in step 614, similarity values determine whether a candidate response is on-topic with a free-text query by measuring how easily a representation of the free-text query is transformed into a representation of the candidate response. Particularly, if a positive match between two text intervals requires many transformations (e.g., adding synonyms, substituting roles, omitting words or phrases), then the cost of making that match increases, and it detracts from how on-topic the text intervals are with respect to each other. Calculating similarity values is useful because natural language formations often allow several ways of expressing similar meanings. A simple word-to-word match limits the number of on-topic candidate responses to a free-text query.

In step 702, a full tree similarity value $\theta$ is calculated between a first augmented proposition tree generated from a free-text query and a second augmented proposition tree generated from a candidate response. In step 704, a subtree similarity value $\eta$ is calculated between a first set of augmented proposition subtrees generated from a free-text query and a second set of augmented proposition subtrees generated from a candidate response. Proposition subtree formation will be further discussed in FIG. 8. In step 706, a bag of nodes similarity value $\mu$ is calculated between a first bag of augmented nodes generated from a free-text query and a second bag of augmented nodes generated from a candidate response. Bag of nodes formation will be further discussed in FIG. 9. In step 708, the relevance of the candidate response to the free-text query is determined based on $\theta$, $\eta$ and $\mu$. In general, a candidate response is on-topic for a free-text query if one of the three similarity values ($\theta$, $\eta$ or $\mu$) exceeds its respective, empirically determined threshold. In alternate implementations, a final similarity value is set to a combination of the three component similarity values.

FIG. 8 is an illustrative example 800 of a comparison between a proposition tree and a proposition subtree, according to an illustrative embodiment of the invention. As discussed previously, although fully expanded proposition trees can be generated from a free-text query and a candidate response, a situation can arise where the two text intervals share very little semantic structure, but the candidate response can still be on-topic with the free-text query. In such scenarios, generating proposition subtrees may be helpful. Proposition subtrees are proposition trees that are generated with expansion criteria that specify smaller expansions. Generation module 214 can generate a variety of proposition trees or subtrees by using different expansion criteria. For example, generation module 214 can generate fully expanded proposition tree 804 from text interval 802. In addition, by specifying smaller expansions for each proposition extracted from a text interval, generation module 214 can also generate proposition subtrees 806 from text interval 802. Each node of a proposition tree can be represented by a number of proposition subtrees. In this example, the "plant" node is present in each proposition subtree in proposition subtrees 806.

Figure 9:
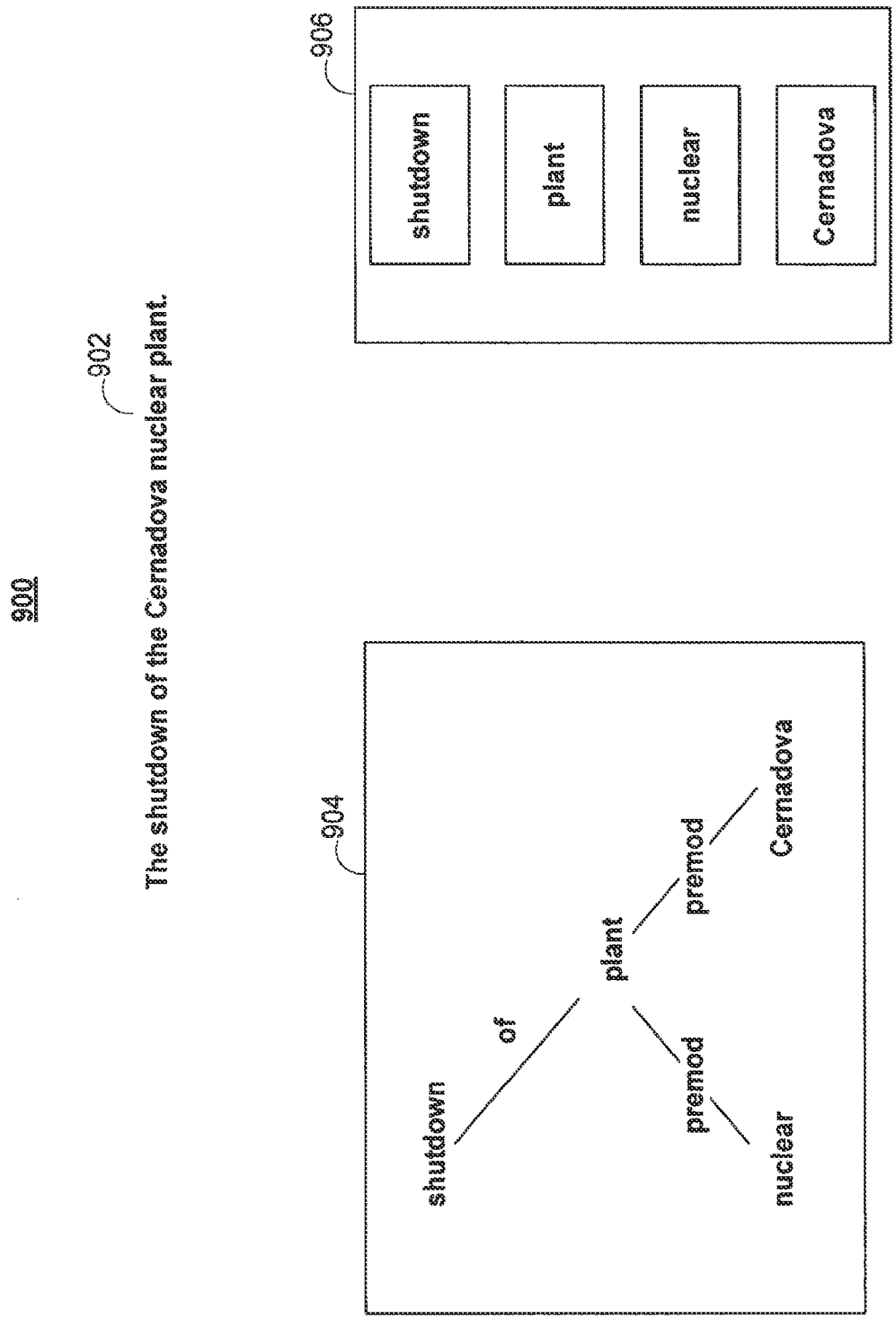
FIG. 9 is an example of a comparison between a proposition tree and a bag of nodes, according to an illustrative embodiment of the invention.

FIG. 9 is an illustrative example 900 of a comparison between a proposition tree and a bag of nodes, according to an illustrative embodiment of the invention. In addition to generating proposition subtrees, a candidate response can be generously matched to a free-text query by transforming proposition trees into a bag of nodes. For example, text interval 902 has been fully expanded to proposition tree 904. Generation module 214 can generate bag of nodes 906 by taking the nodes of proposition tree 904, while ignoring the edges of the tree. In addition, if proposition tree 904 has been augmented, generation module 214 can keep the same augmented nodes in bag of nodes 906.

FIG. 10 is a flowchart 1000 of a method for calculating a full tree similarity value using augmented proposition trees, according to an illustrative embodiment of the invention. In step 1002, the free-text query is converted into a first augmented proposition tree. In step 1004, the candidate response is converted into a second augmented proposition tree. In step 1006, full tree similarity value $\theta$ is calculated to determine the relevance of the candidate response to the free-text query.

One illustration of the full tree similarity value $\theta$ is transformation score $\theta_{ij}$. The transformation score can be calculated by transforming the first augmented proposition tree to the second augmented proposition tree using two different processes.

The first process can be applied to exact match formulations, in which two nodes are considered a match if they are labeled with the same word (or phrase), and if they can be reached from their parents over edges with identical roles, whereby the parent nodes have already been found to be a match. In this method, $\theta_{ij}$ is a binary value of either 0 or 1.

The second process can be applied to situations where proposition trees have been augmented, such as in illustrative example 400. For augmented proposition trees, the matching condition is relaxed so that two nodes match if the intersection of the words associated with the node is not the empty set. Furthermore, transformation score $\theta_{ij}$ is computed according to:

$$\theta_{ij} = \#matched * \gamma^{match} - \bar{\gamma},$$

where $\gamma^{match}$ is a constant match score awarded to each node-to-node match, # matched is the number of such matches for a proposition tree comparison, and $\bar{\gamma}$ is the cumulative cost of these matches. Several factors influence the cost of a match. In a node-to-node match of two augmented proposition trees, if several matching word pairs are possible between words in two augmented nodes, the pair with the lowest sum of word costs can be selected. The lowest sum of word costs can then be added to $\bar{\gamma}$. In some cases, the constraint that the matching nodes must be reached via edges with identical roles is relaxed, which increases $\bar{\gamma}$.

Other factors can incur cost as well. For example, augmentation step 508 may incur costs. The cost of adding a new word to a node can be computed as the cost of the original word incremented by empirically estimated stemming and/or synonym costs. The estimated stemming and/or synonym costs can be adjusted based on the source of augmentation. For instance, augmentation based on synonyms provided by WordNet may have a different cost than augmentation based on words provided by co-reference module 210.

In addition, situations in which role confusions are allowed can also add costs. As described above, roles are labels on the edges of the proposition tree that define the semantic relationship between the nodes of the proposition tree. For example, proposition trees for "Abu Abbas's arrest" and "the arrest of Abu Abbas" differ only because the edge between arrest and Abu Abbas is labeled <possessive> in the first case and "of" in the second case. Allowing the match of these two proposition trees requires taking into account the cost of substituting one role for another role, which adds to $\bar{\gamma}$. Similarly, allowing matches between verbs and their nominalizations (e.g. "communication" and "communicate") can incur additional costs. If a match between two proposition trees requires a set-proposition (e.g., conjunction) node to be bypassed for its children nodes, $\bar{\gamma}$ can increase as well.

Finally, when matching trees, given a likely scenario where not all proposition tree nodes of a free-text query (e.g., "the looting of Iraqi museums after the U.S. invasion") can be transformed to proposition tree nodes of a candidate response (e.g., "the looting of Iraqi museums"), an allowance can be made to relax the match, especially if a significant portion of the rest of the proposition trees in the two sets match with a high match score. However, this incurs a cost that is proportional to the size of the missing portion and the closeness of the missing portion to the root node. That is, the cost increases when the missing portion is closer to the root node of the proposition tree.

In situations where sets of augmented proposition trees have been generated for both the free-text query and the candidate response, transformation scores can be aggregated across the two sets of augmented proposition trees, where each proposition tree may be assigned a different weight. The full tree similarity value $\theta$ is calculated by:

$$\theta := \frac{\sum_i \omega_i * (\theta_i / \theta_i^{max})}{\sum_i \omega_i},$$

where $\omega_i$ is the weight of each proposition tree generated from the free-text query, $\theta_i$ is the aggregate transformation score, and $\theta_i^{max}$ is the pre-computed highest possible transformation score. For matches that have been performed based on fully expanded proposition trees, $\omega_i$ can be adjusted based on the number of nodes in a proposition tree.

Subtree similarity value $\eta$ can be calculated from augmented proposition subtrees in the same way as full tree similarity value $\theta$. The exception is that the weight of each of the proposition subtrees $\omega_i$ may depend on the size of the full proposition tree that encompasses the proposition subtrees.

Bag of nodes similarity value $\mu$ can be calculated by the percentage or weighted sum of augmented nodes in the free-text query that have at least one match in the augmented nodes of the candidate response. The weight of each node $\omega_i$ can depend on the distance between the node and the root node of the augmented proposition tree. The bag of nodes similarity value $\mu$ can incorporate the augmented node cost structure of the augmented proposition trees. Therefore, similarity value $\mu$ is more generous than similarity values $\theta$ and $\eta$.

In another embodiment of the invention, topic classification system 200 can compare proposition trees to eliminate redundant information. As discussed previously, topic classification system 200 can determine whether a text interval is on-topic with another text interval. Moreover, some circumstances may require topic classification system 200 to determine redundancy in text intervals. In order to determine redundancy between a pair of text intervals, matching module 222 can calculate two similarity values from the pair of text intervals. Comparing one text interval proposition tree to another text interval proposition tree generates one similarity value. The other similarity value is generated by the reverse comparison.

For example, topic classification system 200 can be presented with two text intervals. The first text interval is "The shutdown of the Cernadova nuclear plant by the authorities." The second text interval is "The shutdown of the plant." The first text interval can be considered an on-topic response to the second text interval, because the first text interval contains additional information about "plant" that is not provided in the second text interval. However, the second text interval is an off-topic response to the first text interval, because "plant" in the second interval can refer to other plants besides the "Cernadova nuclear plant." Therefore, although the first text interval would be a reasonable candidate response to the query given by the second text interval, the reverse is not true. As a result, only one similarity value should be calculated for this type of matching.

In a situation where the two text intervals are considered for redundancy, generating two-way similarity values may be useful. In the example given above, the first text interval and the second text interval can be regarded as providing redundant information. For instance, if the two text intervals are considered as two candidate responses, matching module 222 may only choose to selectively output the first text interval because it encompasses the information given by the second text interval. Therefore, two similarity values are used to determine redundancy.

The invention may be embodied in other specific forms without departing from the spirit or essential characteristics thereof. The forgoing embodiments are therefore to be considered in all respects illustrative, rather than limiting of the invention.

What is claimed is:

1. A system that processes text intervals, comprising:
   a memory; and
   a processor configured to execute a plurality of modules stored in the memory;
   the modules including:
      a preprocessing module configured to:
         extract a first proposition from a first text interval;
      a generation module configured to:
         provide a plurality of semantic roles, wherein each role of the plurality of roles defines a different semantic relationship between at least two words,
         generate a first proposition tree from the first proposition, wherein the first proposition tree comprises at least one node connected to other nodes by at least one edge, wherein each node is respectively associated with at least one word from the first proposition,
         assign at least one of the plurality of roles to the at least one edge; and
      a matching module configured to:
         determine a first similarity value between the first text interval and a second text interval based on a comparison of the first proposition tree and a second proposition tree corresponding to the second text interval, wherein the second text interval is different from the first text interval and at least one of the first text interval and the second text interval comprises natural language, and
         selectively output the second text interval based on the first similarity value.

2. The system of claim 1, wherein the different semantic relationships defined by respective roles of the plurality of roles include at least one of a preposition-based relationship, a grammar-based relationship, and a conjunction-based relationship.

3. The system of claim 1, wherein the first text interval is a query and the second text interval is a candidate response and the matching module is further configured to output the second text interval if the first similarity value exceeds a threshold.

4. The system of claim 1, wherein the matching module is further configured to:
   determine a second similarity value between the second text interval and the first text interval,
   find the second text interval redundant to the first text interval in response to the first and second similarity values each exceeding respective thresholds, and
   refrain from outputting redundant text intervals.

5. The system of claim 4, wherein determining the first similarity value and the second similarity value comprises performing a two-way comparison between the first and second intervals.

6. The system of claim 1, further comprising:
   an augmentation module configured to, for at least one node in the first proposition tree, associate, with the at least one node, a word having a relationship to the at least one node to form a first augmented proposition tree.

7. The system of claim 6, wherein the relationship is a co-reference relationship.

8. The system of claim 6, wherein associating the word having the relationship comprises:
   identifying a real-world object, concept, or event included in the at least one node,
   identifying alternative words in a document in which the first text interval is included that correspond to the same real-world object, concept, or event, and
   augmenting the at least one node in the first proposition tree with the identified alternative words to create the first augmented proposition tree.

9. The system of claim 6, wherein the relationship is a synonym, hypernym, hyponym, or substitutable label relationship.

10. The system of claim 6, wherein the matching module is configured to determine the first similarity value by determining a number of nodes and a number of edges that match between the first augmented proposition tree and the second proposition tree.

11. The system of claim 10, wherein a first node in the first augmented proposition tree matches a second node in the second proposition tree in response to at least one word in, or associated with, the first node matching a word in, or associated with, the second node.

12. The system of claim 11, wherein in response to the first node matching the second node as a result of a word associated with the first node matching the second node, decreasing the first similarity value based on the relationship between the associated word and the first node.

13. The system of claim 10, wherein a first edge in the first augmented proposition tree matches a second edge in the second proposition tree in response to a semantic relationship associated with the first edge being substitutable for the semantic relationship associated with the second edge.

14. The system of claim 13, wherein in response to the first edge matching the second edge as a result based on a substitute semantic relationship, decreasing the first similarity value based on the substitution.

15. The system of claim 6, wherein the matching module is configured to determine the first similarity value by calculating a transformation score based on costs associated with transforming the first augmented proposition tree to the second proposition tree.

16. The system of claim 6, wherein the second proposition tree comprises an augmented proposition tree.

17. The system of claim 1, wherein the generation module is further configured to:
   generate a first plurality of proposition subtrees and a second plurality of proposition subtrees; and
   the matching module is further configured to:
      determine a second similarity value by matching the first plurality of proposition subtrees to the second plurality of proposition subtrees.

18. The system of claim 1, wherein the generation module is further configured to:
   generate a first bag of nodes from the first proposition tree and a second bag of nodes from the second proposition tree; and
   the matching module is further configured to:
      determine a second similarity value by matching the first bag of nodes to the second bag of nodes.

19. A method of processing text intervals, comprising:
extracting a first proposition from a first text interval;
providing a plurality of semantic roles, wherein each role of the plurality of roles defines a different semantic relationship between at least two words;
generating a first proposition tree from the first proposition, wherein the first proposition tree comprises at least one node connected to other nodes by at least one edge, wherein each node is respectively associated with at least one word from the first proposition;
assigning at least one of the plurality of roles to the at least one edge;
determining a first similarity value between the first text interval and a second text interval based on a comparison of the first proposition tree and a second proposition tree corresponding to the second text interval, wherein the second text interval is different from the first text interval and at least one of the first text interval and the second text interval comprises natural language; and
selectively outputting, using a processor, the second text interval based the first similarity value.

20. The method of claim 19, wherein the different semantic relationships defined by respective roles of the plurality of roles include at least one of a preposition-based relationship, a grammar-based relationship, and a conjunction-based relationship.

21. The method of claim 19, comprising outputting the second text interval if the first similarity value exceeds a threshold, wherein the first text interval is a query and the second text interval is a candidate response.

22. The method of claim 19, comprising:
determining a second similarity value between the second text interval and the first text interval;
finding the second text interval redundant to the first text interval in response to the first and second similarity values each exceeding respective thresholds; and
refraining from outputting redundant text intervals.

23. The method of claim 19, comprising associating, for at least one node in the first proposition tree, a word having a relationship to the at least one node to form a first augmented proposition tree.

24. The method of claim 23, wherein the relationship is a co-reference relationship.

25. The method of claim 23, wherein the relationship is a synonym, hypernym, hyponym, or substitutable label relationship.

26. The method of claim 19, comprising:
generating a first plurality of proposition subtrees and a second plurality of proposition subtrees; and
determining a second similarity value by matching the first plurality of proposition subtrees to the second plurality of proposition subtrees.

27. The method of claim 19, comprising:
generating a first bag of nodes from the first proposition tree and a second bag of nodes from the second proposition tree; and
determining a second similarity value by matching the first bag of nodes to the second bag of nodes.

* * * * *